United States Patent

Shih et al.

[11] Patent Number: 5,940,160
[45] Date of Patent: Aug. 17, 1999

[54] SPECTACLES

[76] Inventors: Hung-Yu Shih, 58 Ma Yuan West St., Taichung, Taiwan; Paul Chen, 2007 Primrose Ave., S. Pasadena, Calif. 91303

[21] Appl. No.: 09/035,932
[22] Filed: Mar. 1, 1998
[51] Int. Cl.⁶ .................. G02C 1/13; G02C 1/08
[52] U.S. Cl. .................................. 351/41; 351/90
[58] Field of Search .................. 351/41, 90–102

[56] References Cited

U.S. PATENT DOCUMENTS 5,465,122  11/1995  Curto et al. .................. 351/41

Primary Examiner—Huy Mai

[57] ABSTRACT

A pair of spectacles has a first frame, a second frame, a first temple, a second temple, a first lens, and a second lens. The first temple has a first annular end. The second temple has a second annular end. The first frame has a first joint, a second joint, a first middle portion, a first notch, and a second notch. The second frame has a third joint, a fourth joint, a second middle portion, a third notch, and a fourth notch. The first middle portion intersects the second middle portion. The first notch engages with the third notch. The second notch engages with the fourth notch. The first annular end is disposed between the first joint and the third joint. The second annular end is disposed between the second joint and the fourth joint.

2 Claims, 4 Drawing Sheets

SPECTACLES

BACKGROUND OF THE INVENTION

The present invention relates to a pair of spectacles. More particularly, the present invention relates to a pair of spectacles which can be assembled easily.

Referring to FIG. 1, a pair of conventional spectacles comprises a frame 71, a first temple 73, a second temple 73, a first lens 72, and a second lens 72. The frame 71 has a first eyewire 711 surrounding the first lens 72, a second eyewire 711 surrounding the second lens 72, a bridge 712 connected to the first eyewire 711 and the second eyewire 711, a first wire 713 soldered on the first eyewire 711, a second wire 713 soldered on the second eyewire 711, a first tab 714 disposed on the first eyewire 711, and a second tab 714 disposed on the second eyewire 711. The first temple 73 is connected to the first eyewire 711. The second temple 73 is connected to the second eyewire 711. However, the bridge 712 should be soldered on the frame 71. The first wire 713 and the second wire 713 are soldered also. The user cannot solder the bridge 712 on the frame 71 by himself. The user cannot solder the first wire 713 on the first eyewire 711 and the second wire 713 on the second eyewire 711 by himself.

SUMMARY OF THE INVENTION

An object of the present invention is to provide a pair of spectacles which can be assembled easily.

Accordingly, a pair of spectacles comprises a first frame, a second frame, a first temple, a second temple, a first lens, and a second lens. The first temple has a first annular end. A first through hole is formed on the first annular end. The second temple has a second annular end. A second through hole is formed on the second annular end. The first frame has a first joint disposed on a first end of the first frame, a second joint disposed on a second end of the first frame, a first middle portion, a first notch formed on the first middle portion, and a second notch formed on the first middle portion. The first joint has a first round hole and a first circular hole. The second joint has a second round hole and a second circular hole. The second frame has a third joint disposed on a first end of the second frame, a fourth joint disposed on a second end of the second frame, a second middle portion, a third notch formed on the second middle portion, and a fourth notch formed on the second middle portion. The third joint has a third round hole and a third circular hole. The fourth joint has a fourth round hole and a fourth circular hole. The first middle portion of the first frame intersects the second middle portion of the second frame. The first notch engages with the third notch. The second notch engages with the fourth notch. The first annular end of the first temple is disposed between the first joint and the third joint. The second annular end of the second temple is disposed between the second joint and the fourth joint. The first lens is disposed between the first frame and the second frame. The second lens is disposed between the first frame and the second frame. A spacing is formed between the first middle portion of the first frame and the second middle portion of the second frame. A bridge device has two curved insertion portions, a middle rod between the curved insertion portions, and two annular tabs disposed on two distal ends of the bridge device. The middle rod is inserted through the spacing. The curved insertion portions are positioned in the spacing.

DETAILED DESCRIPTION OF THE INVENTION

Figure 1:
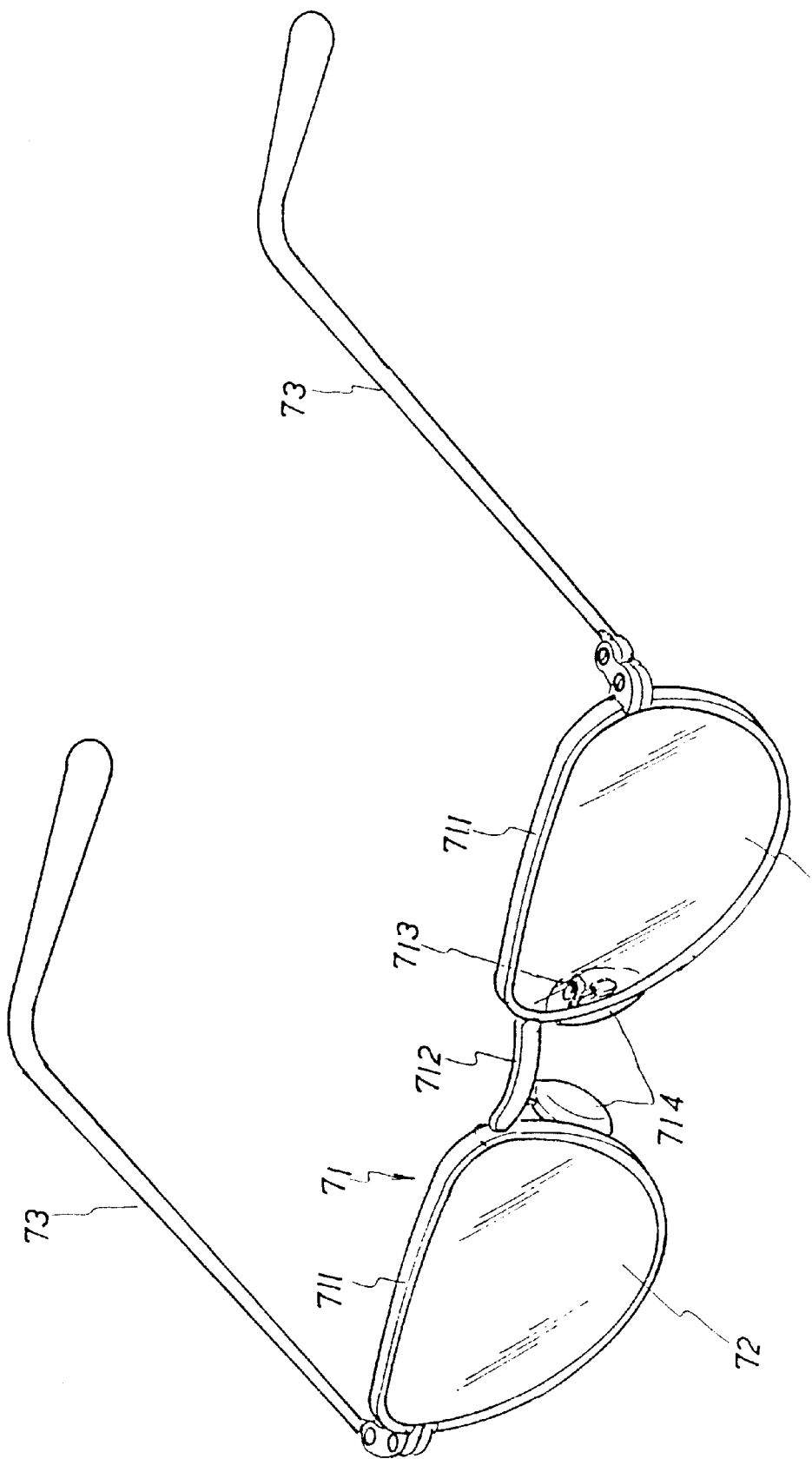
FIG. 1 is a perspective assembly view of a pair of conventional spectacles of the prior art.
Figure 2:
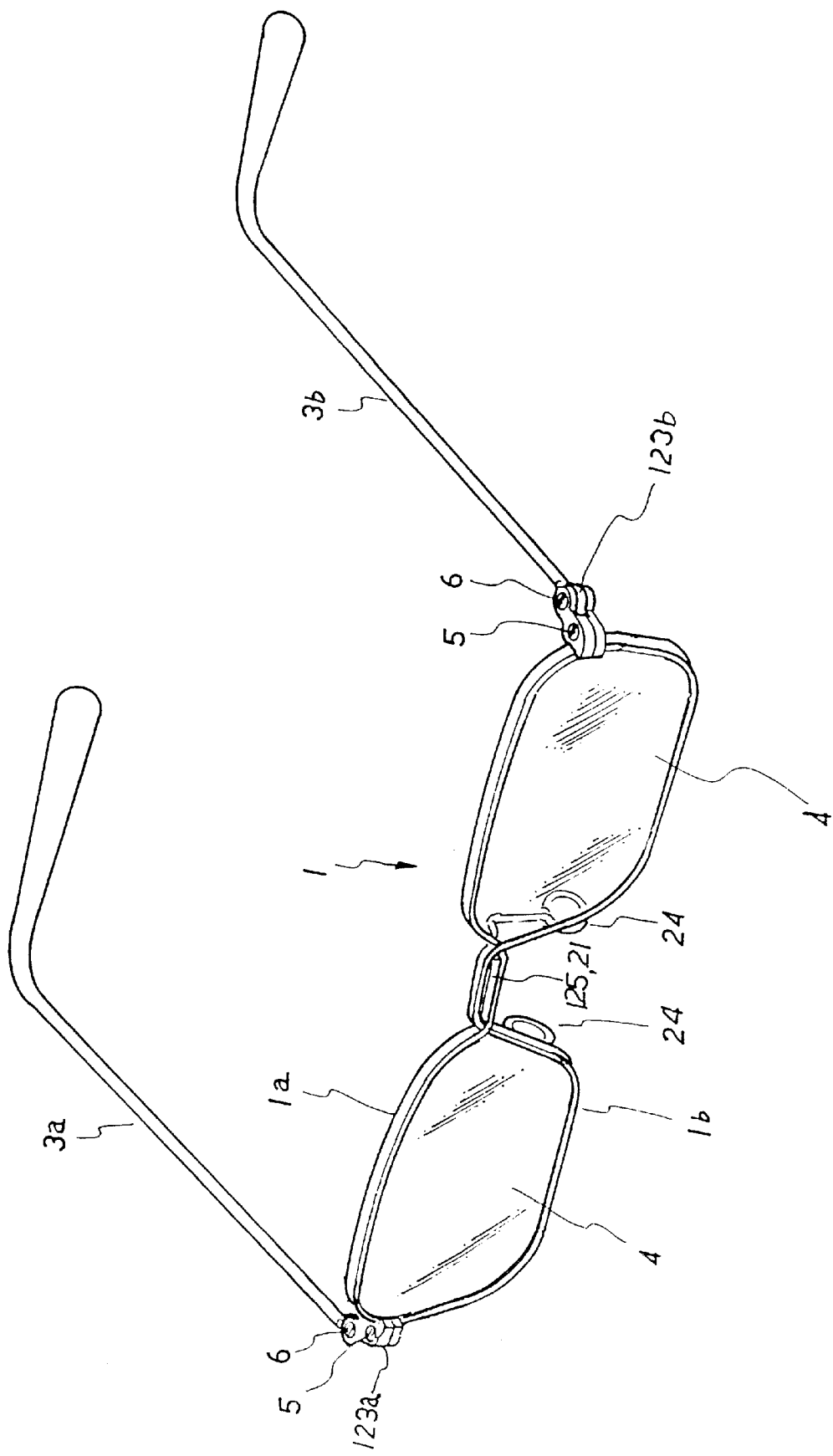
FIG. 2 is a perspective assembly view of a pair of spectacles of a preferred embodiment in accordance with the present invention.
Figure 3:
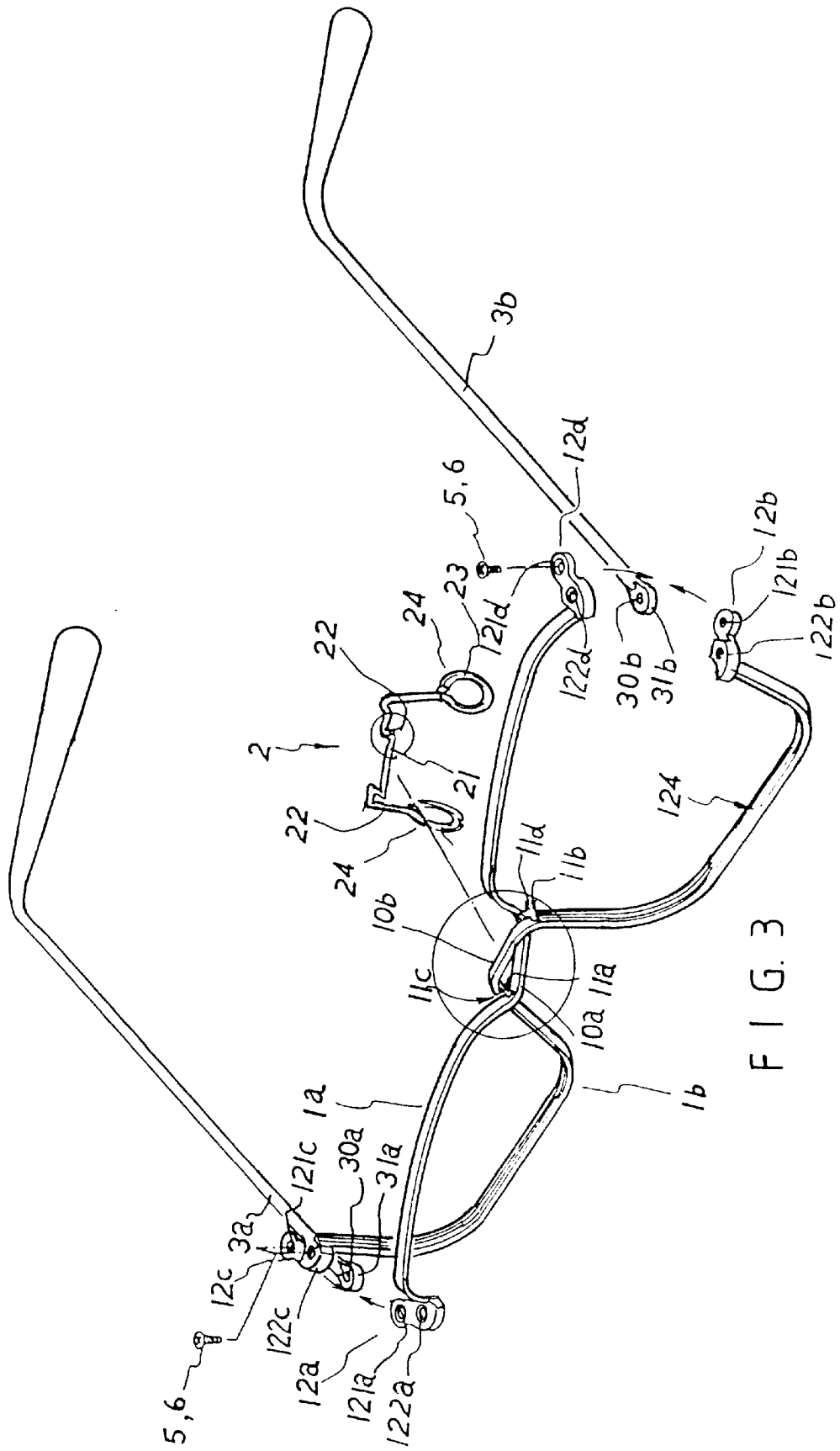
FIG. 3 is a perspective exploded view of a pair of spectacles of a preferred embodiment in accordance with the present invention.
Figure 3B:
FIG. 3B is a partially perspective enlarged view of a middle rod of a bridge device of a preferred embodiment in accordance with the present invention.
Figure 3A:
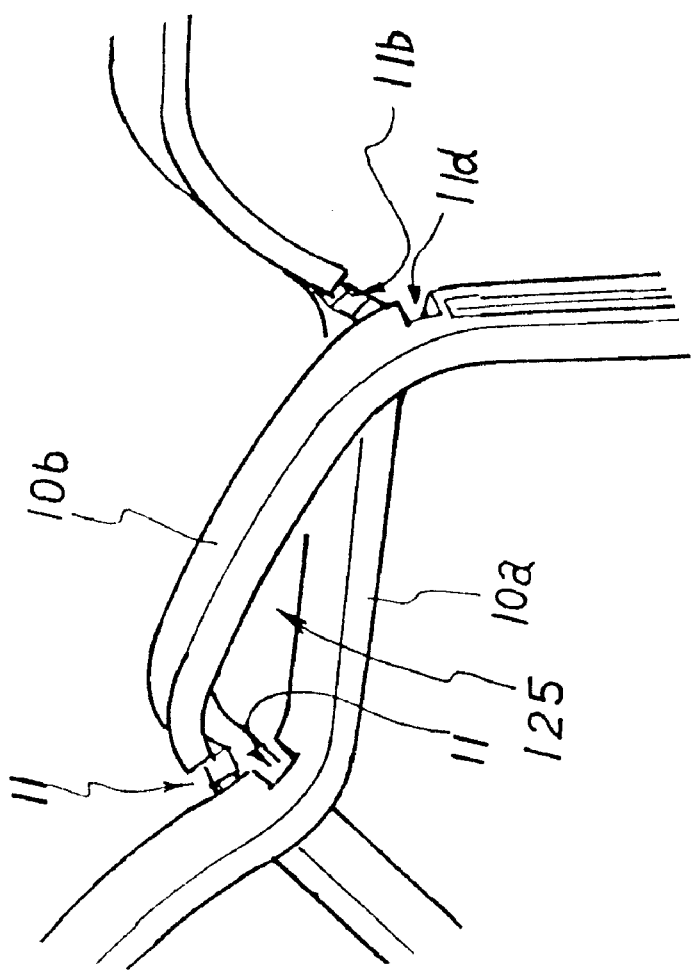
FIG. 3A is a partially perspective enlarged view of a middle portion of a first frame and a middle portion of a second frame of a preferred embodiment in accordance with the present invention.

Referring to FIGS. 2 to 3B, a pair of spectacles comprises a first frame 1a, a second frame 1b, a first temple 3a, a second temple 3b, a bridge device 2, a first lens 4, and a second lens 4.

The first temple 3a has a first annular end 31a. A first through hole 30a is formed on the first annular end 31a. The second temple 3b has a second annular end 31b. A second through hole 30b is formed on the second annular end 31b.

The bridge device 2 has two curved insertion portions 22, a middle rod 21 between the curved insertion portions 22, and two annular tabs 23 disposed on two distal ends 24 of the bridge device 2.

The first frame 1a has a first joint 12a disposed on a first end of the first frame 1a, a second joint 12d disposed on a second end of the first frame 1a, a first middle portion 10a, a first notch 11a formed on the first middle portion 10a, and a second notch 11d formed on the first middle portion 10a. The first joint 12a has a first round hole 121a and a first circular hole 122a. The second joint 12d has a second round hole 121d and a second circular hole 122d.

The second frame 1b has a third joint 12c disposed on a first end of the second frame 1b, a fourth joint 12b disposed on a second end of the second frame 1b, a second middle portion 10b, a third notch 11c formed on the second middle portion 10b, and a fourth notch 11b formed on the second middle portion 10b. The third joint 12c has a third round hole 121c and a third circular hole 122c. The fourth joint 12b has a fourth round hole 121b and a fourth circular hole 122b.

The first middle portion 10a of the first frame 1a intersects the second middle portion 10b of the second frame 1b. The first notch 11a engages with the third notch 11c. The second notch 11d engages with the fourth notch 11b. The first annular end 31a of the first temple 3a is disposed between the first joint 12a and the third joint 12c. The second annular end 31b of the second temple 3b is disposed between the second joint 12d and the fourth joint 12b. The first lens 4 is disposed between the first frame 1a and the second frame 1b. The second lens 4 is disposed between the first frame 1a and the second frame 1b. A spacing 125 is formed between the first middle portion 10a of the first frame 1a and the second middle portion 10b of the second frame 1b. The middle rod 21 is inserted through the spacing 125. The curved insertion portions 22 are positioned in the spacing 125. Two fasteners 5, 6 fasten the first temple 3a, the first joint 12a and the third joint 12c together. Two additional fasteners 5, 6 fasten the second temple 3b, the second joint 12b and the fourth joint 12d together.

The invention is not limited to the above embodiment but various modification thereof may be made. Further, various changes in form and detail may be made without departing from the scope of the invention.

I claim:

1. A pair of spectacles comprises:

a first frame, a second frame, a first temple, a second temple, a first lens, and a second lens, the first temple having a first annular end, a first through hole formed on the first annular end, the second temple having a second annular end, a second through hole formed on the second annular end, the first frame having a first joint disposed on a first end of the first frame, a second joint disposed on a second end of the first frame, a first middle portion, a first notch formed on the first middle portion, and a second notch formed on the first middle portion, the first joint having a first round hole and a first circular hole, the second joint having a second round hole and a second circular hole, the second frame having a third joint disposed on a first end of the second frame, a fourth joint disposed on a second end of the second frame, a second middle portion, a third notch formed on the second middle portion, and a fourth notch formed on the second middle portion, the third joint having a third round hole and a third circular hole, the fourth joint having a fourth round hole and a fourth circular hole, the first middle portion of the first frame intersecting the second middle portion of the second frame, the first notch engaginmg with the third notch, the second notch engaging with the fourth notch, the first annular end of the first temple disposed between the first joint and the third joint, the second annular end of the second temple disposed between the second joint and the fourth joint, the first lens disposed between the first frame and the second frame, the second lens disposed between the first frame and the second frame, and a spacing formed between the first middle portion of the first frame and the second middle portion of the second frame.

2. A pair of spectacles as claimed in claim 1, wherein a bridge device has two curved insertion portions, a middle rod between the curved insertion portions, and two annular tabs disposed on two distal ends of the bridge device, the middle rod is inserted through the spacing, and the curved insertion portions are positioned in the spacing.

* * * * *